Figure 1:
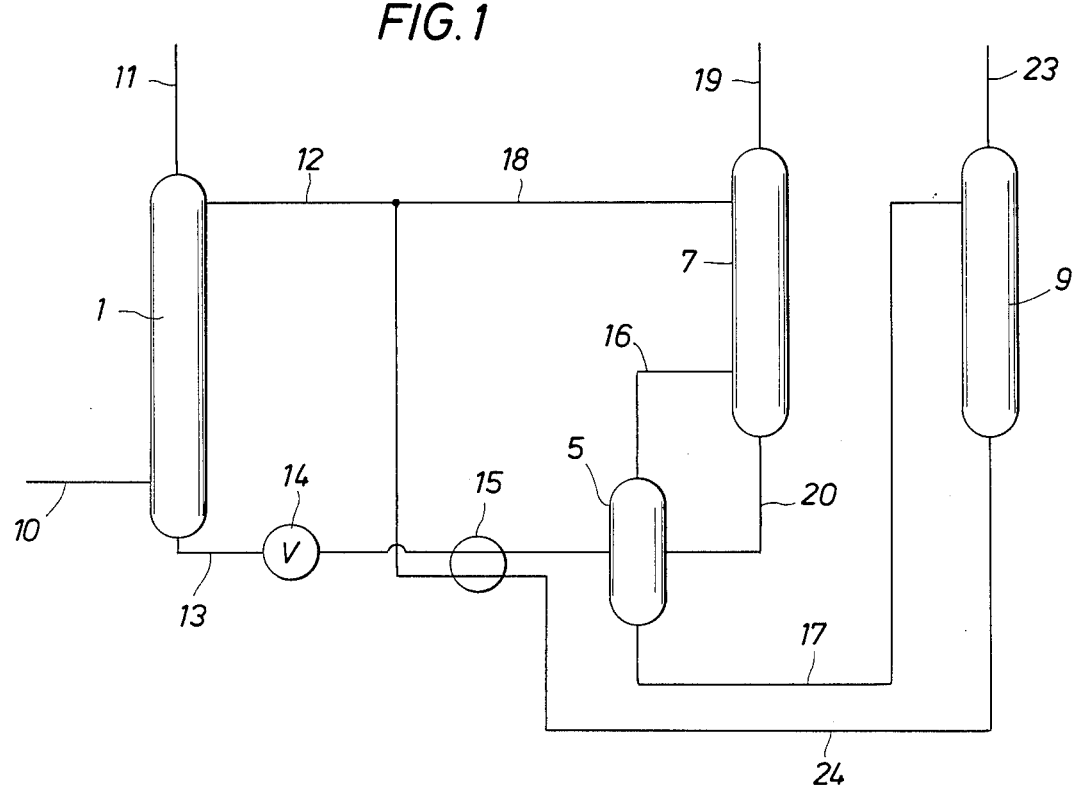

United States Patent [19]

Wansink

[11] Patent Number: 4,714,480
[45] Date of Patent: Dec. 22, 1987

[54] REMOVAL OF ACID GASES FROM A GAS MIXTURE

[75] Inventor: Derk H. N. Wansink, The Hague, Netherlands

[73] Assignee: Shell Oil Company, Houston, Tex.

[21] Appl. No.: 941,884

[22] Filed: Dec. 15, 1986

[30] Foreign Application Priority Data

Jan. 9, 1986 [NL] Netherlands ............... 8600030

[51] Int. Cl.$^4$ ............................................... B01D 19/00
[52] U.S. Cl. ............................................. 55/43; 55/49; 55/68; 55/73; 423/228
[58] Field of Search ................... 55/43, 49, 68, 73; 423/228, 229, 220

[56] References Cited

U.S. PATENT DOCUMENTS

| | | | |
|---|---|---|---|
| 2,860,030 | 11/1958 | Goldtrap | 23/2 |
| 3,630,666 | 12/1971 | Kunkel | 23/2 |
| 4,397,660 | 8/1983 | Pas Tornstra | 423/228 |
| 4,407,784 | 10/1983 | Blanc et al. | 423/229 |

FOREIGN PATENT DOCUMENTS

| | | | |
|---|---|---|---|
| 3408851 | 9/1985 | Fed. Rep. of Germany | 55/73 |
| 2103645 | 2/1983 | United Kingdom . | |

*Primary Examiner*—Bernard Nozick

[57] ABSTRACT

Process for selectively removing $H_2S$ from a gas mixture including $H_2S$ and $CO_2$ comprising contacting the gas mixture in a first contacting zone (1) with lean absorbent to obtain loaded absorbent, heating in heat exchanger (15) loaded absorbent, flashing in separating vessel (5) the heated loaded absorbent to obtain a partly purified absorbent and a $CO_2$-rich gas mixture, contacting the $CO_2$-rich gas mixture with a lean absorbent in second contacting zone (7) to obtain $H_2S$-loaded absorbent, adding the $H_2S$-loaded absorbent to the loaded absorbent before heating, and regenerating the partly purified absorbent in a regenerating zone (9) to obtain lean absorbent and $H_2S$-rich gas.

5 Claims, 2 Drawing Figures

REMOVAL OF ACID GASES FROM A GAS MIXTURE

BACKGROUND OF THE INVENTION

1. Field of the Invention

The invention relates to a process for the selective removal of $H_2S$ from a gas mixture containing $H_2S$ and $CO_2$, in particular a gas mixture containing a relatively high proportion of $CO_2$. An example of such a gas mixture is natural gas.

2. Description of the Prior Art

It is known to purify such a gas mixture by contacting it in a contacting zone with a lean and regenerable absorbent, from which zone a purified gas mixture and a loaded absorbent are removed. The loaded absorbent is regenerated in a regeneration zone with the addition of heat in order to obtain a regenerated absorbent and a gas mixture, and the regenerated absorbent is introduced into the first contact zone.

A correct choice of contact zone and absorbent enables the $H_2S$ to be almost entirely removed and the $CO_2$ to be partly removed from the gas mixture being purified. The gas mixture obtained on regenerating the absorbent therefore contains $CO_2$ in addition to $H_2S$. Assuming a gas mixture containing 1 volume part of $H_2S$ to 50 volume parts of $CO_2$, the gas mixture obtained after regeneration will contain, depending on the absorbent used, 1 volume part of $H_2S$ to 10-15 volume parts of $CO_2$.

As the gas mixture obtained after regeneration of the absorbent is led to a Claus unit for recovering sulphur, it is important to keep the quantity of $CO_2$ in this gas as small as possible.

SUMMARY OF THE INVENTION

It is an object of the invention to provide a process that achieves a further lowering of the $CO_2$ content in the gas mixture obtained after regeneration of the absorbent.

To this end, the process for the selective removal of $H_2S$ from a gas mixture containing $H_2S$ and $CO_2$ comprises according to the invention:

(a) contacting in a first contact zone at elevated pressure the gas mixture with a lean and regenerable absorbent, from which zone purified gas mixture and a first loaded absorbent are removed;

(b) heating the first loaded absorbent and flashing in a separating vessel at reduced pressure a substantially $CO_2$-containing off-gas from the first loaded absorbent, from which separating vessel off-gas and partly loaded solvent are removed;

(c) contacting in a second contact zone the off-gas with a lean and regenerable absorbent, from which zone an almost $H_2S$-free gas mixture and a second loaded absorbent are removed;

(d) adding the second loaded absorbent to the first loaded absorbent;

(e) introducing the partly loaded absorbent into a regeneration zone in order to obtain a regenerated absorbent that can be used as a lean and regenerable absorbent in steps (a) and (c), and a substantially $H_2S$-containing gas mixture.

In the description and in the claims a lean absorbent is also understood to include a semi-lean absorbent.

Figure 2:
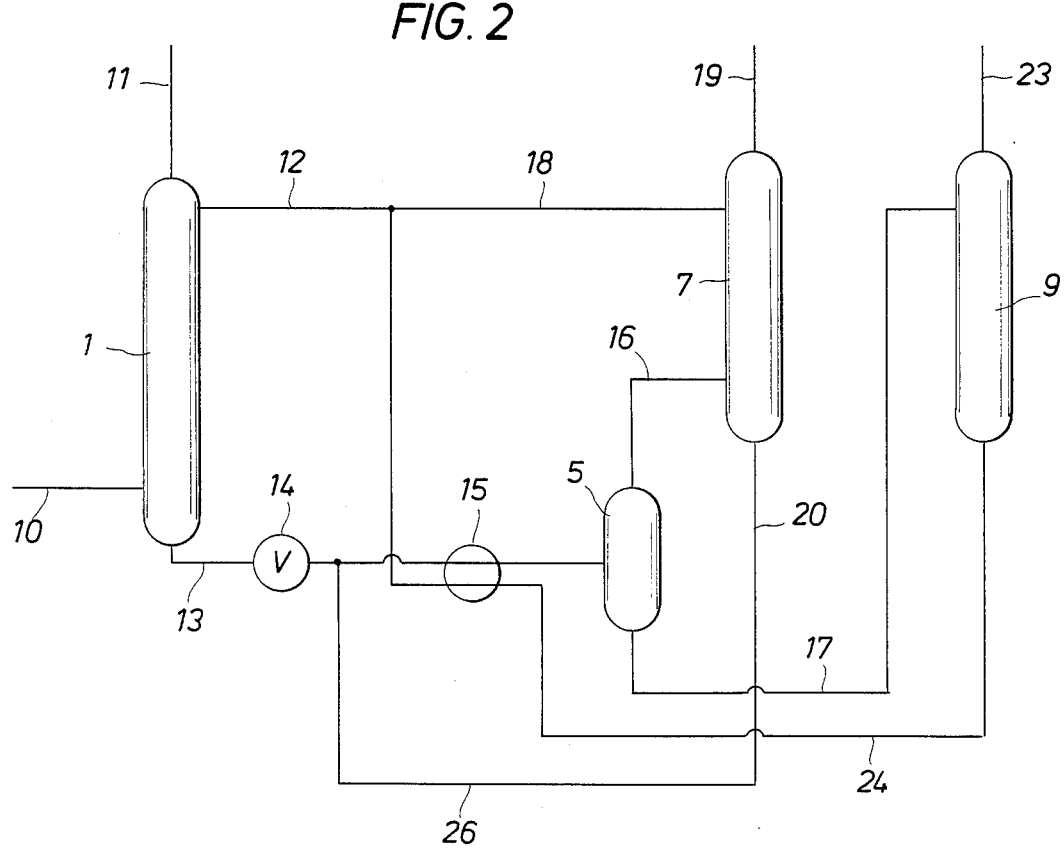

The invention will now be described by way of example in more detail with reference to the drawings, in which FIG. 1 shows a first apparatus for carrying out the process according to the invention; and FIG. 2 shows a second apparatus for carrying out the process according to the invention.

The apparatus for carrying out the process for the removal of acid gases such as $H_2S$ and $CO_2$ from a gas mixture comprises a first contact zone in the form of a first contact column 1, a separating vessel 5, a second contact zone in the form of a second contact column 7, and a regeneration zone 9.

To the first contact column 1 are connected a gas supply line 10, a gas exhaust line 11, an absorbent supply line 12 and an absorbent discharge line 13 which is also connected to the separating vessel 5 and in which a pressure reducer 14 and a heat exchanger 15 are installed.

The separating vessel 5 is connected by an off-gas exhaust line 16 to the second contact column 7 and by an absorbent line 17 to the regeneration zone 9.

Connected to the second contact column 7 are an absorbent supply line 18, a gas exhaust line 19 and an absorbent discharge line 20 which is also connected to the separating vessel 5.

Connected to the regeneration zone 9 are a gas exhaust line 23 which runs to a Claus unit (not shown) and an absorbent line 24 which is also connected to the absorbent supply line 12 and the absorbent supply line 18 and which runs via the heat exchanger 15.

During normal operations a gas mixture to be purified that contains acidic components such as $CO_2$ and $H_2S$ is introduced via gas supply line 10 into the first contact column 1 where it is contacted at elevated pressure with a lean and regenerable absorbent that selectively absorbs $H_2S$, which absorbent is introduced into the first contact column 1 via the absorbent supply line 12. Purified, almost $H_2S$-free gas mixture is removed from the first contact column 1 via the gas exhaust line 11, and absorbent loaded with $H_2S$ and $CO_2$ (first loaded absorbent) is removed from the first contact column 1 via the absorbent discharge line 13.

The first loaded absorbent is led through the absorbent discharge line 13 to the separating vessel 5 via the pressure reducer 14, so that the pressure of the first loaded absorbent downstream of the pressure reducer 14 is lower than the pressure in the first contact column 1, and via the heat exchanger 15 in which it is heated up.

In the separating vessel 5 and at reduced pressure and a higher temperature than in the first contact column 1 a substantially $CO_2$-containing off-gas is flashed from the first loaded absorbent with the formation of a partly loaded absorbent. Partly loaded absorbent is removed from the separating vessel 5 via the absorbent line 17, and substantially $CO_2$-containing off-gas is led via the off-gas exhaust line 16 to the second contact column 7.

The off-gas is contacted in the second contact column 7 with a lean and regenerable absorbent that selectively absorbs $H_2S$, which absorbent is introduced into the second contact column via the absorbent supply line 18. A substantially $H_2S$-free, $CO_2$-containing gas mixture is removed from the second contact column 7 through the gas exhaust line 19 and second loaded absorbent is removed through the absorbent discharge line 20.

The second loaded absorbent leaving the second contact column 7 is added to the first loaded absorbent in the separating vessel 5, so that it is heated by the hot first loaded absorbent. In the separating vessel 5 a substantially $CO_2$-containing off-gas is flashed from the hot mixture of the absorbents.

The partly loaded absorbent leaving the separating vessel 5 is led to the regeneration zone 9 via the absorbent line 17 where the absorbent is regenerated while applying heat in order to obtain a regenerated, substantially lean absorbent and a substantially $H_2S$-containing gas mixture. The substantially $H_2S$-containing gas mixture is led via the gas exhaust line 23 to a Claus unit, and the regenerated absorbent is led via the absorbent line 24 to the absorbent supply line 12 and the absorbent supply line 18 for use in the first contact column 1 and in the second contact column 7. The regenerated absorbent passes the heat exchanger 15 where it transfers a part of its heat to the first loaded absorbent, and possibly an additional cooler (not shown) to cool it further to a suitable temperature for absorption.

Because the absorbent selectively absorbs $H_2S$, the ratio of the volume parts of $H_2S$ and $CO_2$ in the first loaded absorbent leaving the first contact column 1 is greater than the ratio of the volume parts of $H_2S$ and $CO_2$ in the gas mixture to be purified in the first contact column 1. Because, moreover, the absorbent absorbs $H_2S$ preferentially to $CO_2$, $CO_2$ will be preferentially desorbed in the separating vessel 5 relative to $H_2S$ from the loaded absorbent, so that the ratio of the volume parts of $H_2S$ and $CO_2$ in the partly loaded absorbent is greater than the ratio of $H_2S$ and $CO_2$ in the first loaded absorbent.

The off-gas from the separating vessel 5 contains $H_2S$ as well as $CO_2$. In the second contact column 7 $H_2S$ is selectively removed from the off-gas, so that the gas mixture leaving the second contact column 7 consists substantially of $CO_2$ and the ratio of the volume parts of $H_2S$ and $CO_2$ in the second loaded absorbent is greater than the ratio of the volume parts of $H_2S$ and $CO_2$ in the off-gas leaving the separating vessel 5.

By adding the second loaded absorbent to the first loaded absorbent, a substantially $CO_2$-containing off-gas is removed from the mixture of the two absorbents, so that the partly loaded absorbent introduced into the regeneration zone 9 has a higher ratio of the volume parts of $H_2S$ and $CO_2$ than if the second loaded absorbent had not been added to the first loaded absorbent.

After regeneration of the absorbent, a gas mixture is obtained with a higher ration of the volume parts of $H_2S$ and $CO_2$ than in the first loaded absorbent, so that a gas mixture is obtained that is richer in $H_2S$.

Because the second loaded absorbent is often cooler than the heated first loaded absorbent that enters the separating vessel 5, the temperature of the liquid in the separating vessel 5 falls and this has a detrimental effect on the desorption of gas from loaded absorbent.

In order to improve the desorption, the temperature of the first loaded absorbent can be raised, possibly by introducing into the absorbent discharge line 13 an extra heat source (not shown) next to the heat exchanger 15. This measure has the effect that, starting with a gas mixture to be purified with a ratio of the volume parts of $H_2S$ and $CO_2$ of 1:50 and depending on the temperature rise, a gas mixture is obtained after regeneration of the absorbent with a ratio of the volume parts of $H_2S$ and $CO_2$ of approximately 1:4.

A drawback of the extra heating of the first loaded absorbent is, however, that, in order to obtain the desired effect, the temperature may become so high that components in the absorbent decompose and become inactive. This imposes a limit on the enrichment.

A second embodiment of the invention which does not have this drawback is discussed with reference to FIG. 2. Parts of the apparatus shown in FIG. 2 which correspond with parts shown in the apparatus according to FIG. 1 have the same reference numerals.

In the apparatus shown in FIG. 2, the absorbent discharge line 20 of the second contact column 7 is connected to a line 26 which is connected to the absorbent discharge line 13 at a point upstream of the heat exchanger 15.

The operation of the apparatus according to FIG. 2 is almost the same as that of the apparatus according to FIG. 1, except that the second loaded absorbent is added to the first loaded absorbent upstream of the heat exchanger 15, so that all the loaded absorbent is heated up in the heat exchanger 15 to the temperature needed for the desorption of off-gas from absorbent.

Assuming a maximum permissible absorbent temperature, a higher temperature can be obtained in the separating vessel 5 with the process described with reference to FIG. 2 than with the process described with reference to FIG. 1, and thus a better enrichment of the gas mixture obtained after regeneration of the absorbent.

Assuming a gas mixture to be purified with a ratio of the volume parts of $H_2S$ and $CO_2$ of 1:50, the apparatus according to FIG. 2 enables a gas mixture after regeneration to be obtained with a ratio of the volume parts of $H_2S$ and $CO_2$ of about 1:1.

If necessary, an additional heat source can be installed in the absorbent discharge line 13 downstream of the point where the line 26 is connected to the absorbent discharge line 13.

In the apparatus shown, the pressure reducer 14 is installed upstream of the heat exchanger 15, but it can also be installed downstream of the heat exchanger 15.

The absorbents which can be used for the process according to the invention are preferably those absorbents which preferentially absorb $H_2S$, such as aqueous solutions of aliphatic tertiary amines or tertiary alkanol amines, for example, monoethanol amine, methyl diethanolamine, diisopropanol amine optionally also comprising a physical absorbent such as sulfolane (tetrahydrothiophene 1,1-dioxide)and substituted sulfolanes.

During normal operation the temperature in the first contact column will be between about 30° C. and 50° C. and the pressure between about 3 MPa (absolute) and 10 MPa (absolute). In the separating vessel the temperature will be between about 80° C. and 110° C. and the pressure between about 0.1 MPa (absolute) and 0.4 MPa (absolute). In addition, the temperature in the second contact column will be between about 30° C. and 50° C. and the pressure between about 0.1 MPa (absolute) and 0.4 MPa (absolute). The regeneration is carried out by heating the absorbent in the regeneration zone to a temperature of between 80° C. and 160° C., which heating is preferably done with steam.

In the above-described processes the first loaded absorbent is heated with the aid of hot regenerated absorbent in the heat exchanger 15 before the first loaded absorbent is introduced into the separating vessel 5. Instead of this, the first loaded absorbent can be heated in the separating vessel 5 by passing the hot regenerated absorbent through a suitable line (not shown) in the separating vessel 5.

The heating of the first loaded absorbent and the evaporation in a separating vessel at reduced pressure of a substantially $CO_2$-containing off-gas from the first loaded absorbent can be preceded by the evaporation at reduced pressure of a gas consisting substantially of hydrocarbons from the, optionally heated, first loaded absorbent. The pressure at which the gas consisting substantially of hydrocarbons is evaporated will lie between the pressure in the first contact column and the pressure in the separating vessel.

Furthermore, the heating of the first loaded absorbent and the evaporation in a separating vessel at reduced pressure of a substantially $CO_2$-containing gas from the first loaded absorbent can be performed in two steps, the two off-gas streams obtained in the first step and in the second step being led to separate second contact columns, and it being possible to add the absorbents leaving these contact columns to the first loaded absorbent.

What is claimed is:

1. A process for the selective removal of $H_2S$ from a gas mixture containing $H_2S$ and $CO_2$, comprising:
    (a) contacting in a first contact zone at elevated pressure the gas mixture with a lean and regenerable absorbent, from which zone purified gas mixture and a first loaded absorbent containing $H_2S$ and $CO_2$ are removed;
    (b) heating the first loaded absorbent and flashing in a separating vessel at reduced pressure a substantially $CO_2$-containing off-gas including a minor amount of $H_2S$ from the first loaded absorbent, from which separating vessel off-gas and partly loaded absorbent are removed;
    (c) contacting in a second contact zone the off-gas with a lean and regenerable absorbent that selectively absorbs $H_2S$, from which zone an almost $H_2S$-free $CO_2$-containing gas mixture and a second loaded absorbent are removed;
    (d) adding the second loaded absorbent to the first loaded absorbent in the separating vessel or upstream of the heating in step (b);
    (e) introducing the partly loaded absorbent from steps (b) and (d) into a regeneration zone and obtaining a regenerated absorbent used as the lean and regenerable absorbent in steps (a) and (c), and a substantially $H_2S$-containing gas mixture.

2. A process according to claim 1, wherein the second loaded absorbent is added to the first loaded absorbent in the separating vessel.

3. A process according to claim 1, wherein the second loaded absorbent is added to the first loaded absorbent before being heated.

4. A process according to claim 1, wherein the absorbent is an aliphatic tertiary amine or aliphatic tertiary alkanol amine.

5. A process according to claim 1, wherein the initial gas mixture to be purified has a ratio of the volume parts of $H_2S$ and $CO_2$ of 1:50.

* * * * *